(12) United States Patent
Schloss

(10) Patent No.: US 7,067,065 B2
(45) Date of Patent: Jun. 27, 2006

(54) VORTEX GRIT COLLECTOR WITH MECHANICAL CONVEYOR FOR GRIT REMOVAL

(75) Inventor: Charles M. Schloss, Englewood, CO (US)

(73) Assignee: Schloss Engineered Equipment, Inc., Aurora, CO (US)

( * ) Notice: Subject to any disclaimer, the term of this patent is extended or adjusted under 35 U.S.C. 154(b) by 214 days.

(21) Appl. No.: 10/421,150

(22) Filed: Apr. 23, 2003

(65) Prior Publication Data

US 2004/0211733 A1 Oct. 28, 2004

(51) Int. Cl.
*B01D 21/24* (2006.01)
*B01D 21/26* (2006.01)

(52) U.S. Cl. ............ 210/803; 210/787; 210/806; 210/257.1; 210/304; 210/523; 210/532.1; 210/534; 134/132

(58) Field of Classification Search ............ 210/787, 210/788, 801, 803, 806, 257.1, 304, 512.1, 210/512.3, 523, 532.1, 800, 534; 134/65, 134/132
See application file for complete search history.

(56) References Cited

U.S. PATENT DOCUMENTS

| 4,767,532 A | * | 8/1988 | Weis ............... 210/512.3 |
| 5,569,379 A | * | 10/1996 | Schloss ............ 210/512.3 |
| 5,591,348 A | * | 1/1997 | Felder et al. ....... 210/512.1 |

* cited by examiner

*Primary Examiner*—David A. Reifsnyder

(74) *Attorney, Agent, or Firm*—Gibson, Dunn & Crutcher LLP

(57) ABSTRACT

A grit removal device, as may be used in a water or wastewater treatment plant, has a vortex grit collector and a mechanical conveyor for removing the grit from the collector. The grit collector includes a tank having an influent channel and an effluent channel, and a stirrer or other mechanism for inducing vortex flow within the tank. The tank has a sump located beneath it, wherein grit settles. A mechanical conveyor, such as a rotating screw, removes and dewaters grit from the sump to an exterior location. The conveyor is preferably offset from the horizontal. The invention also includes a method of grit removal employing the device.

12 Claims, 5 Drawing Sheets

US 7,067,065 B2

VORTEX GRIT COLLECTOR WITH MECHANICAL CONVEYOR FOR GRIT REMOVAL

FIELD OF THE INVENTION

The invention relates the field of water de-sanding equipment of the type used in water and wastewater treatment plants. In particular, the invention is a vortex grit collector having a sump and a mechanical conveyor for removing and dewatering grit from the sump. The preferred conveyor is an inclined screw.

BACKGROUND

Water de-sanding (i.e., removal of grit) is an important process in water and wastewater treatment plants. In most contemporary sewage (wastewater) treatment plants, the first treatment process is screening and removing relatively large material, and the second process is removing grit. "Grit" includes sand and materials of similar size and density such as pieces of grout, cement, and tile. If not removed, grit can damage subsequent treatment and process equipment and needlessly occupy volume in digesters.

Various means have been used to remove inorganic and putrescible material in the grit collection operation while maintaining organic and putrescible material suspending in the flow of water passing out of the grit collection, so that such material might subsequently be removed and treated and disposed of without causing health problems or environmental impact. These means employed include velocity control via channel design, weirs and baffles, mechanical mixing, and aeration.

Essentially all grit collectors rely on gravity or an induced force such as centrifugal force, which can be expressed in "G's," equivalent to some multiple of the Earth's gravitational force. Some such devices, such those taught by Weis, U.S. Pat. No. 4,767,532, and Schloss, U.S. Pat. No. 5,569,379 (both incorporated by reference), show mechanically agitated grit collectors where the agitators provide a relatively constant velocity to the tank contents. Grit from these and similar collectors is removed by a pump and disposed of through a concentrator, cyclone, decanting device, or the equivalent. Usually the grit is pumped to a grit concentrator (or hydrocyclone) wherein the grit is separated from typically around 95% of the water by modern involute fed, 20 degree cyclone, then the thickened grit slurry is discharged into a grit washer/classifier whence it is conveyed from the water and washed by the rotation of a conveying screw. While such systems are effective, they are relatively energy inefficient. It will thus be appreciated that a superior means to remove grit from a grit collector is a significant improvement in the state of the art.

Figure 1:
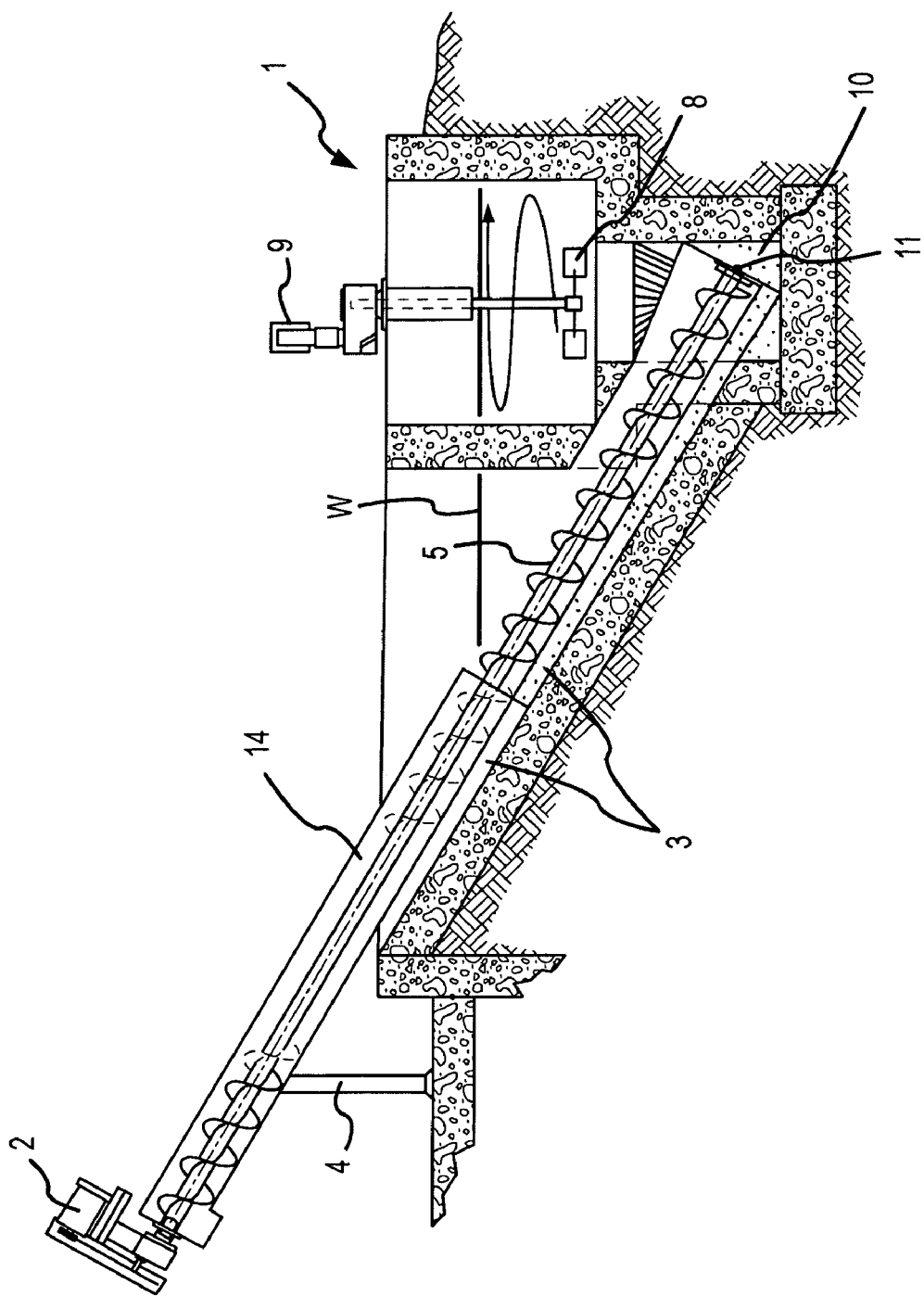
FIG. 1 is a side elevation section view of an embodiment of the invention.

REFERENCE CHARACTERS 1 tank
2 motor and drive for 5
3 trough or pipe
4 support for 3
5 conveyor
6 influent channel
7 effluent channel
8 stirrer
9 motor and drive
10 sump
11 bearing for 5
12 gate
13 bypass
14 conveyor trough safety cover
15 nozzle
W water line

DETAILED DESCRIPTION

It is a purpose of this invention to provide a device and method for removing grit from a grit collector without the necessity of a pump, and to still provide for dewatering and washing of the grit. This invention accomplishes its purpose and is energy conserving, relatively simple, and uses low speed machinery. This results in less wear, less vulnerability to plugging, and fewer hydraulic losses.

Figure 2:
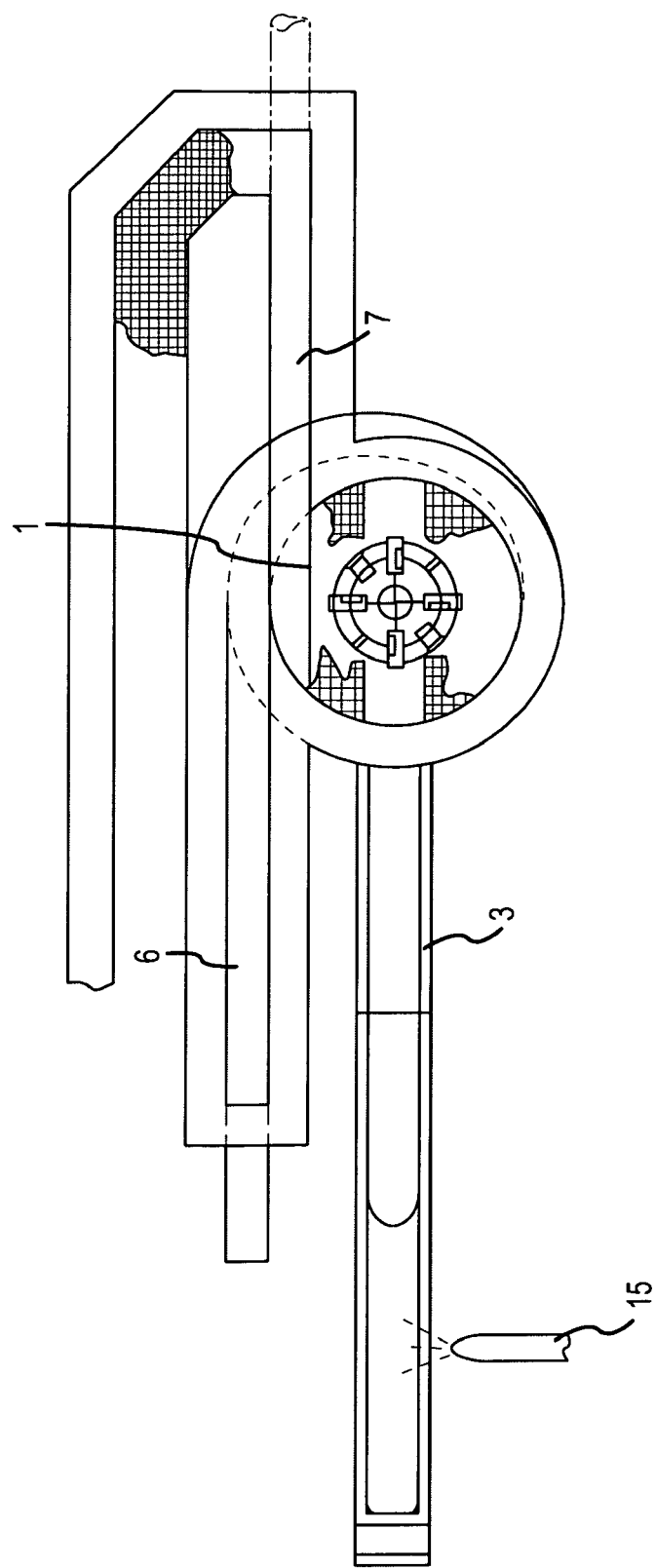
FIG. 2 is a plan view of an embodiment of the invention.

Referring to FIG. 1, the invention includes a conventional grit collector tank 1 such as disclosed by Weiss or Schloss as mentioned above. The grit collector could be made of concrete, metal, or other material. The grit collector includes a tank 1 having an influent channel 6 and an effluent channel 7, as shown in the plan view of FIG. 2. A means for providing vortex flow such as a stirrer 8 driven by a conventional motor and drive 9 is situated within the tank 1.

A sump 10 is beneath the tank 1 and in fluid communication therewith. In operation, grit in the fluid stream of the influent channel 6 introduced into the tank 1 will settle into the sump 10.

A trough or pipe 3 extends so that a portion of the trough or pipe 3 communicates with the sump 10, and another portion of the trough or pipe 3 is exterior to the sump. Throughout this description, the word "trough" will be used with the understanding that it includes a pipe or any other material conveying structure. The word "pipe" is added to the claims so the claims' scope can be easily determined.

The purpose of the trough is to contain a conveyor 5, and the material conveyed by it, described below. The trough is preferably inclined from the horizontal, as shown. This inclination can be achieved via a support 4 that props up a section of the trough 3, or otherwise. The trough preferably has a conveyor safety cover 14 that extends about to a water line W. In a preferred embodiment, the trough 3 is constructed of cement below the water line W, and metal above.

Figure 3:
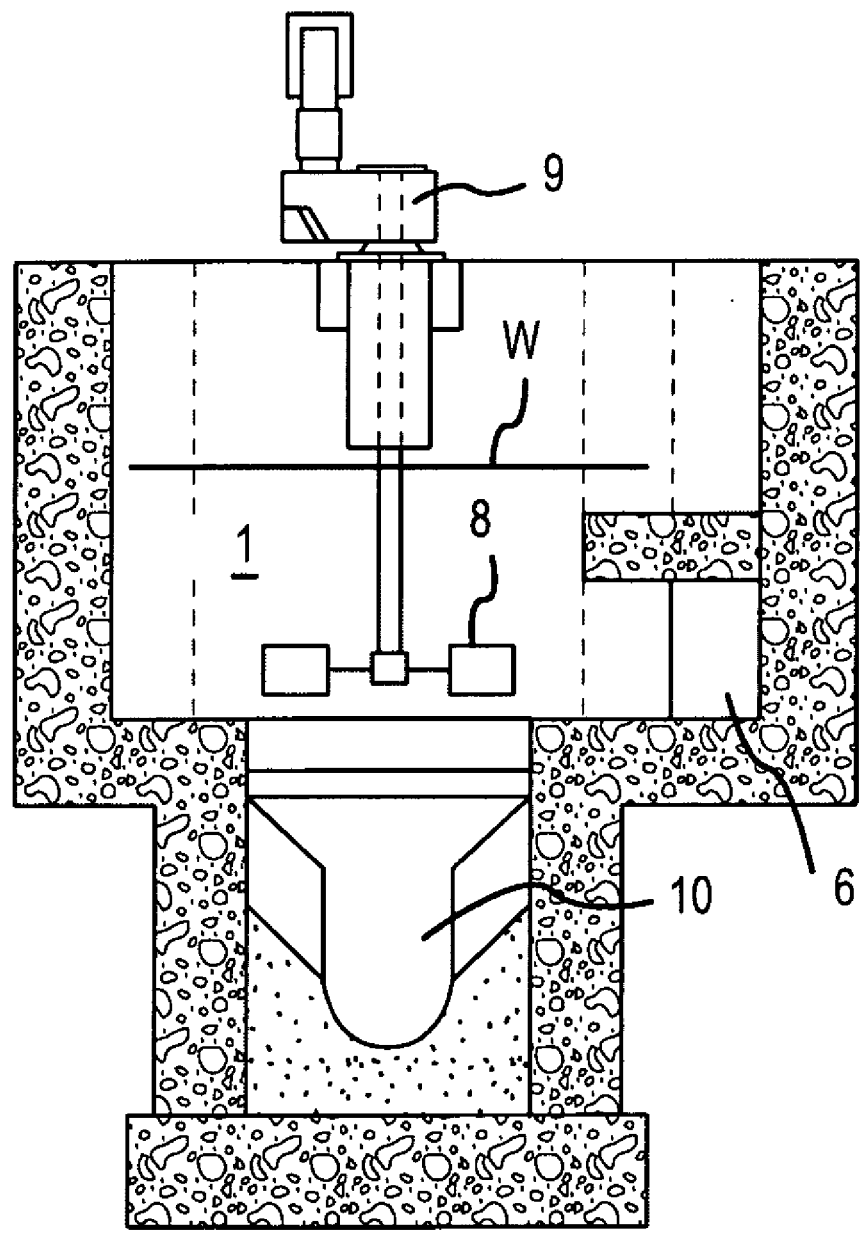
FIG. 3 is a cross section view of an embodiment of the invention, taken along the line A—A in FIG. 2.
Figure 4:
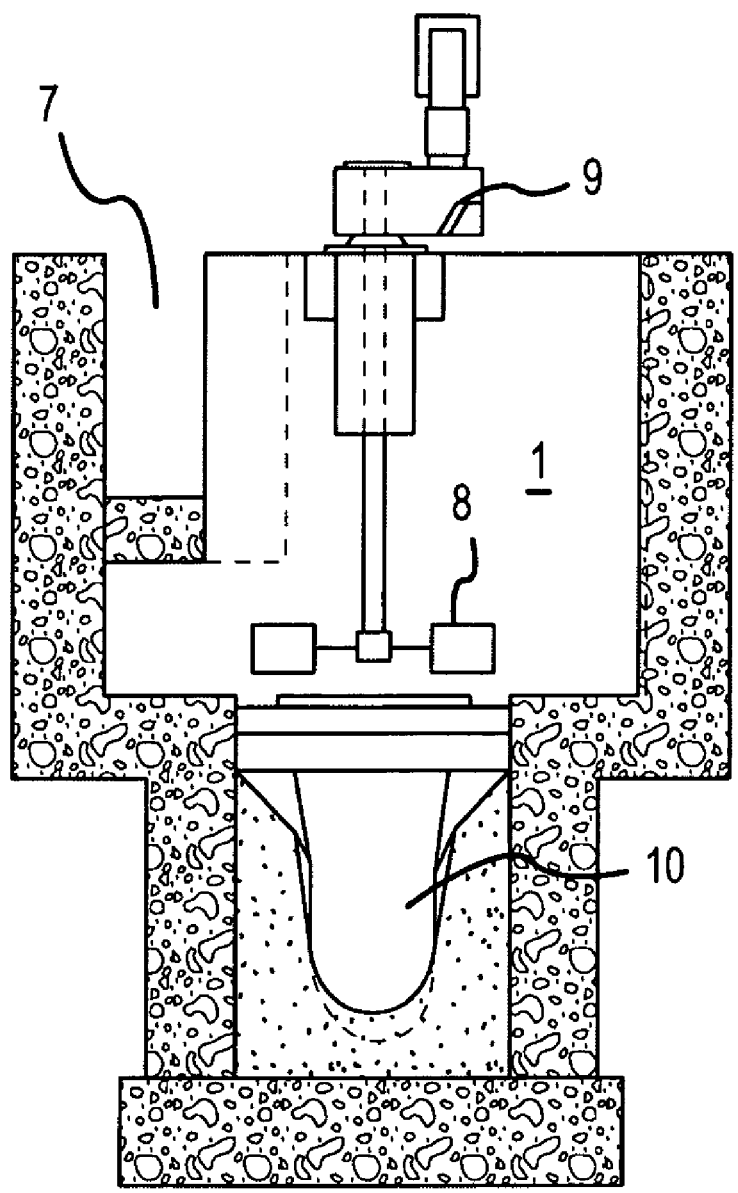
FIG. 4 is another cross-section view of an embodiment of the invention, taken along the line C—C in FIG. 2.

Sectional views of the tank 1 and associated components are shown in FIGS. 3 and 4. In particular, FIG. 3 is a sectional view looking into the influent channel 6, and FIG. 4 is a sectional view looking into the effluent channel 7. As is conventional in grit settling chambers, the effluent channel 7 is at a higher elevation than the influent channel 6.

Again referring to FIG. 1, a conveyor 5 is positioned within the trough, so that one end extends into the sump 10 and another end extends to a position exterior to the sump. The purpose of the conveyor 5 is to remove grit from the sump 10. In an embodiment of the invention, the conveyor 5 is a screw, as shown in FIG. 1. The conveyor 5 may be either shafted or shaftless, or a combination as is known in the art of screw conveyors. If the screw is shafted as shown, the conveyor will normally rest on a bearing 11. If the screw is shaftless, it will typically rest on wear bars (bearing strips). A motor and associated drive assembly 2 rotates the conveyor, as is known. The conveyor 5 is preferably inclined from the horizontal; the conveyor will typically be inclined at the same angle as the trough 3 as shown. Further, the conveyor 5 may have variable pitch, variable diameter, or both, and may have intermediate supporting hanger bearings, depending on its length. All of these features are known in the art of screw conveyors and thus need not be described in detail.

In operation, the rotation of the conveyor 5 will transport grit out of the sump 10, as desired. Conveying the grit via conveyor 5 also provides for dewatering and washing of the grit. The grit can be delivered into a truck or otherwise, as may be desired.

Figure 5:
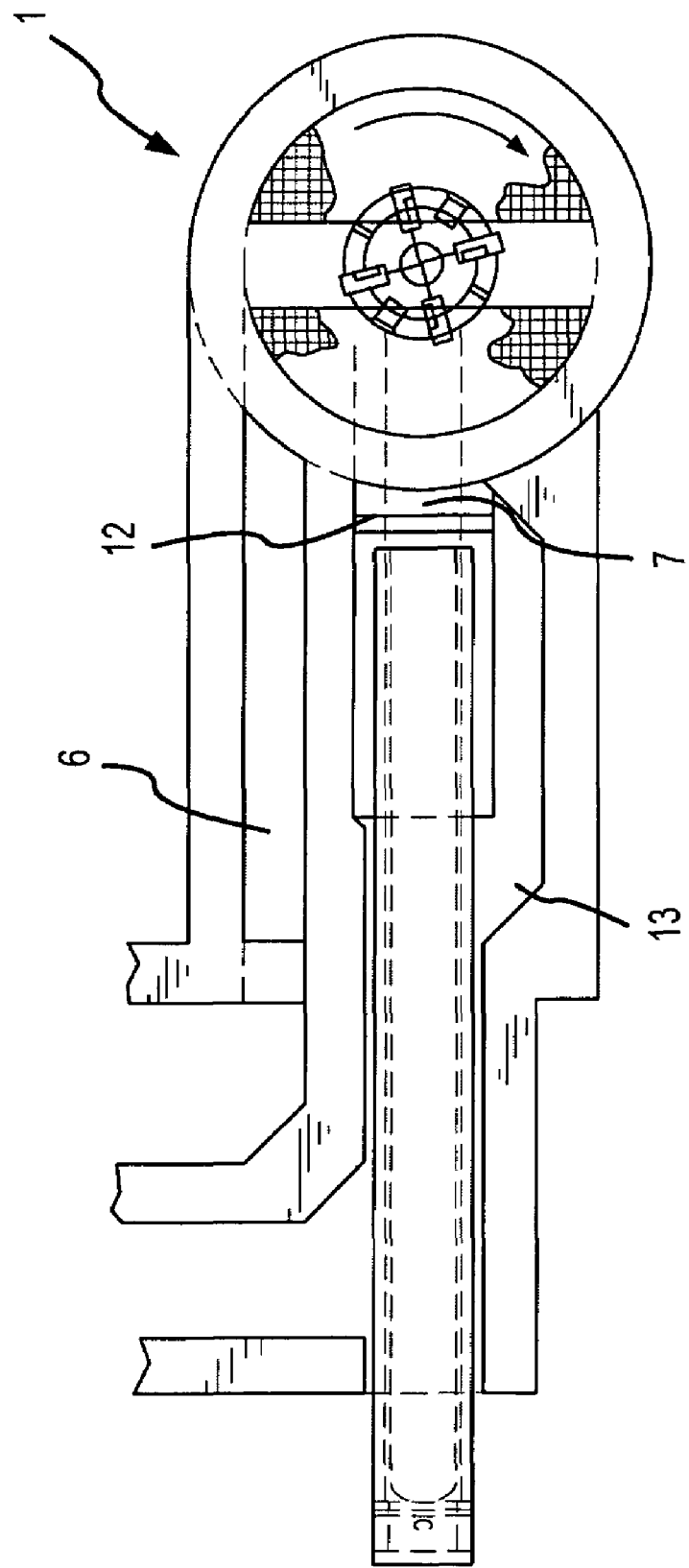
FIG. 5 is a plan view of another embodiment of the invention.

Another embodiment of the invention is shown in FIG. 5. In this embodiment, the conveyor 5 is partially situated within a portion of the effluent channel, depending upon the position of a gate 12 positioned within the effluent channel 7. If the gate 12 is in an open position, the fluid in the effluent channel 7 will wash the grit being transported by the conveyor 5. If the gate 12 is in a closed position, the fluid in the effluent channel will be diverted into a bypass section 13 of the effluent channel, and will not wash the grit. The gate may be partially opened; i.e., intermediate settings are provided. An advantage of this arrangement is that the grit can be washed when and as much as desired. An another alternative, the conveyor 5 may be partially situated within a portion of the influent channel 6 instead of the effluent channel as described above.

A water source such as from the influent or effluent channel or otherwise can be used to clean the grit from the conveyor 5. See nozzle 15 in FIG. 2. The water supply to the nozzle 15 is not shown, as it could be from any source. I.e., liquid flow induced by a pump or impeller is used to clean the grit.

In other alternate embodiments, the conveyor 5 is some other type of mechanical conveyor than a screw. As examples, the conveyor could be a reciprocating rake, a chain conveyor, or a belt or cleated-belt conveyor.

I claim:

1. A grit removal device comprising:
   a tank having an influent channel leading into the tank and an effluent channel leading out of the tank;
   means for inducing vortex flow within the tank;
   a sump beneath the tank for the collection of grit;
   a trough or pipe having an end situated inside the sump and another end situated outside the sump, the trough or pipe being inclined from the horizontal; and
   a mechanical conveying means situated at least partially within said trough or pipe for removing and dewatering grit from the sump to an exterior location; and
   a gate that directs water from the effluent channel into the mechanical conveying means when the gate is in an open position.

2. The device of claim 1, wherein the gate can be adjusted to vary the among of water directed from the effluent channel.

3. The device of claim 1, wherein the gate is partially within the effluent channel.

4. A grit removal device comprising:
   a tank having an influent channel leading into the tank and an effluent channel leading out of the tank;
   means for inducing vortex flow within the tank;
   a sump beneath the tank for the collection of grit;
   a trough or pipe having an end situated inside the sump and another end situated outside the sump, the trough or pipe being inclined from the horizontal; and
   a mechanical conveying means situated at least partially within said trough or pipe for removing and dewatering grit from the sump to an exterior location; and
   a gate that directs water from the influent channel into the mechanical conveying means when the gate is in an open position.

5. The device of claim 4, wherein the gate can be adjusted to vary the among of water directed from the influent channel.

6. The device of claim 4, wherein the gate is partially within the influent channel.

7. A method of grit removal comprising:
   (a) providing a tank having an influent channel leading into the tank and an effluent channel leading out of the tank;
   (b) inducing vortex flow within the tank;
   (c) providing a sump beneath the tank for the collection of grit;
   (d) providing a trough or pipe having an end situated inside the sump and another end situated outside the sump, the trough or pipe being inclined from the horizontal; and
   (e) mechanically conveying grit from the sump to an exterior location using means at least partially within said trough or pipe; and
   (f) opening a gate to direct water from the effluent channel into means in paragraph (e).

8. The method of claim 7, wherein the gate can be adjusted to vary the among of water directed from the effluent channel.

9. The method of claim 7, wherein the gate is partially within the effluent channel.

10. A method of grit removal comprising:
    (a) providing a tank having an influent channel leading into the tank and an effluent channel leading out of the tank;
    (b) inducing vortex flow within the tank;
    (c) providing a sump beneath the tank for the collection of grit;
    (d) providing a trough or pipe having an end situated inside the sump and another end situated outside the sump, the trough or pipe being inclined from the horizontal; and
    (e) mechanically conveying grit from the sump to an exterior location using means at least partially within said trough or pipe; and
    (f) opening a gate to direct water from the influent channel into means in paragraph (e).

11. The method of claim 10, wherein the gate can be adjusted to vary the among of water directed from the influent channel.

12. The method of claim 10, wherein the gate is partially within the influent channel.

* * * * *